(12) United States Patent
Busby et al.

(10) Patent No.: US 12,074,415 B1
(45) Date of Patent: Aug. 27, 2024

(54) SHRINK BOOT SEALANT ASSEMBLIES

(71) Applicant: THE PATENT WELL LLC, Fort Worth, TX (US)

(72) Inventors: Jeff Busby, Millsap, TX (US); Michael Dry, Fort Worth, TX (US); Kent Boomer, Aledo, TX (US); Matt Boyd, Fort Worth, TX (US)

(73) Assignee: The Patent Well LLC, Fort Worth, TX (US)

( * ) Notice: Subject to any disclaimer, the term of this patent is extended or adjusted under 35 U.S.C. 154(b) by 822 days.

(21) Appl. No.: 16/742,448

(22) Filed: Jan. 14, 2020

Related U.S. Application Data

(60) Provisional application No. 62/792,666, filed on Jan. 15, 2019.

(51) Int. Cl.
| | |
|---|---|
| *H02G 15/18* | (2006.01) |
| *B29C 65/02* | (2006.01) |
| *F16J 15/10* | (2006.01) |

(52) U.S. Cl.
CPC ............. *H02G 15/18* (2013.01); *B29C 65/02* (2013.01); *F16J 15/104* (2013.01); *B29K 2995/0049* (2013.01)

(58) Field of Classification Search
CPC ............ B29K 2995/0049; F16J 15/104; B29C 65/02; H02G 15/18
See application file for complete search history.

(56) References Cited

U.S. PATENT DOCUMENTS

| | | | | |
|---|---|---|---|---|
| 3,419,669 A | * | 12/1968 | Dienes .................... | H02G 15/18 249/173 |
| 3,515,798 A | * | 6/1970 | Sievert .................... | F16B 4/004 285/915 |
| 3,555,168 A | * | 1/1971 | Frykberg ............. | H05K 9/0015 277/654 |
| 3,742,123 A | * | 6/1973 | Haub, Jr. ................. | H01R 4/22 174/74 A |
| 3,816,640 A | * | 6/1974 | Varner ............... | H02G 15/1833 156/49 |
| 3,879,249 A | * | 4/1975 | Filreis .................... | H02G 15/06 174/76 |
| 4,451,696 A | * | 5/1984 | Beinhaur ................. | H01R 4/64 174/76 |
| 4,849,580 A | * | 7/1989 | Reuter ............... | H01R 13/5216 174/76 |
| 4,900,877 A | * | 2/1990 | Dubrow ............... | H05K 9/0015 174/358 |
| 4,963,700 A | * | 10/1990 | Olsen .................... | H02G 15/18 174/92 |
| 5,415,713 A | * | 5/1995 | Vatcher .................. | H02G 15/04 156/48 |
| 5,702,111 A | * | 12/1997 | Smith .................... | F16J 15/123 277/944 |
| 6,103,975 A | * | 8/2000 | Krabs ............... | H02G 15/1833 174/74 A |

(Continued)

*Primary Examiner* — Eugene G Byrd
(74) *Attorney, Agent, or Firm* — Daniel Chapman; Jack V. Musgrove

(57) ABSTRACT

An assembly to provide a moisture proof or moisture resistant seal about a bundle of wires. The assembly includes a shrink boot, such as a cold shrink boot, and a tacky sealant, such as a polyurethane gel, that will deform and flow under the pressure of a collapsing tube of the shrink boot.

13 Claims, 9 Drawing Sheets

(56) References Cited

U.S. PATENT DOCUMENTS

| | | | | |
|---|---|---|---|---|
| 6,530,577 B1* | 3/2003 | Busby | ............... | B32B 27/04 |
| | | | | 277/651 |
| 6,693,320 B1* | 2/2004 | DeBoer | ............ | H01L 21/32134 |
| | | | | 257/E21.309 |
| 6,911,596 B2* | 6/2005 | Ohtsubo | ............ | H02G 15/1833 |
| | | | | 174/74 A |
| 7,279,516 B2* | 10/2007 | D'Errico | ............ | B32B 17/10761 |
| | | | | 428/920 |
| 7,304,242 B1* | 12/2007 | Dower | ............... | H02G 15/1833 |
| | | | | 174/77 R |
| 9,136,687 B2* | 9/2015 | Gassaway | ............... | F16L 57/00 |
| 10,837,555 B2* | 11/2020 | Busby | ............... | F16J 15/122 |
| 2008/0076854 A1* | 3/2008 | Sohal | ............... | H01B 7/285 |
| | | | | 523/173 |
| 2014/0015204 A1* | 1/2014 | Boyd | ............... | F16J 15/104 |
| | | | | 277/640 |
| 2016/0268790 A1* | 9/2016 | Panfil | ............... | B61D 49/00 |

* cited by examiner

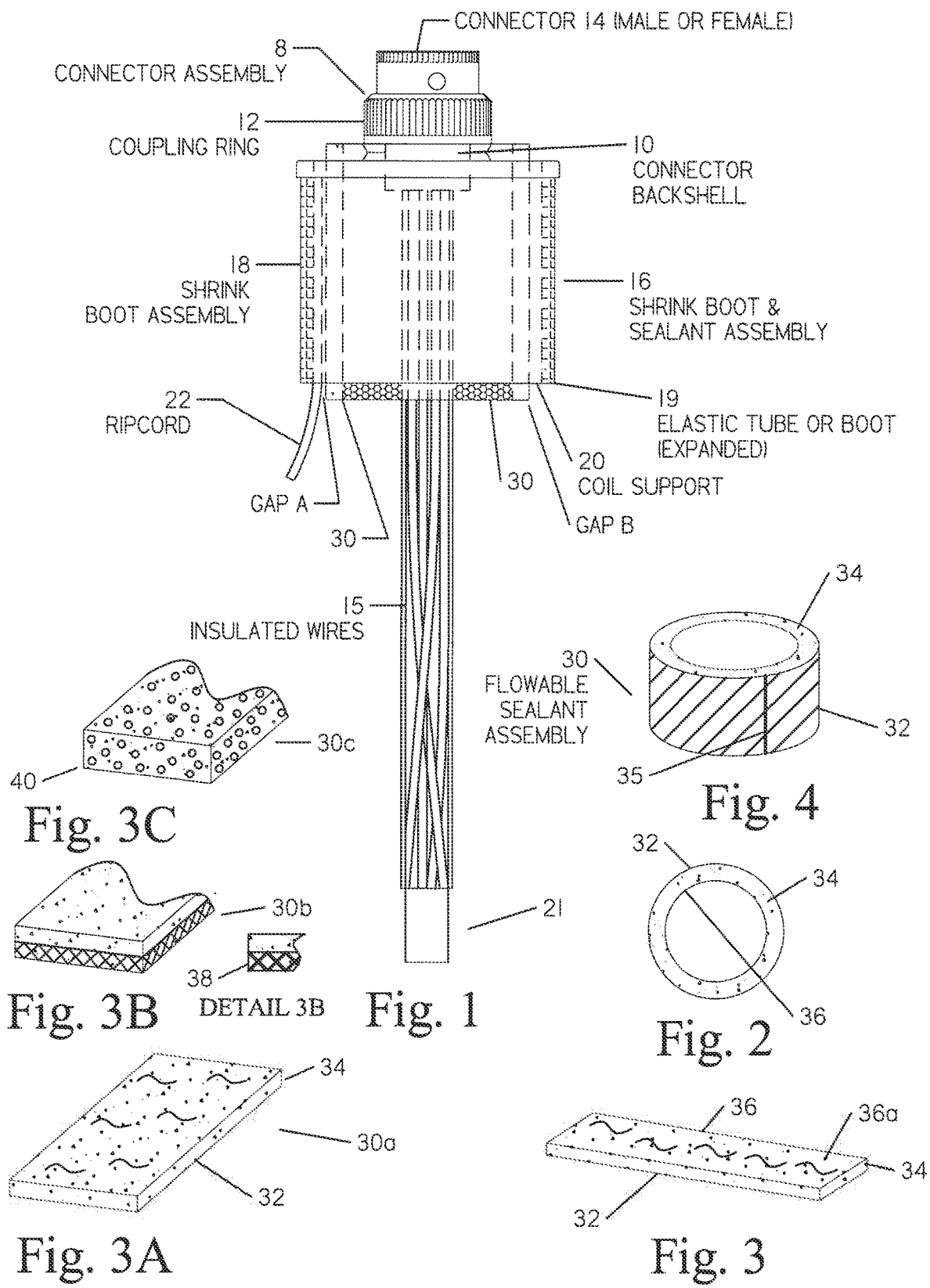

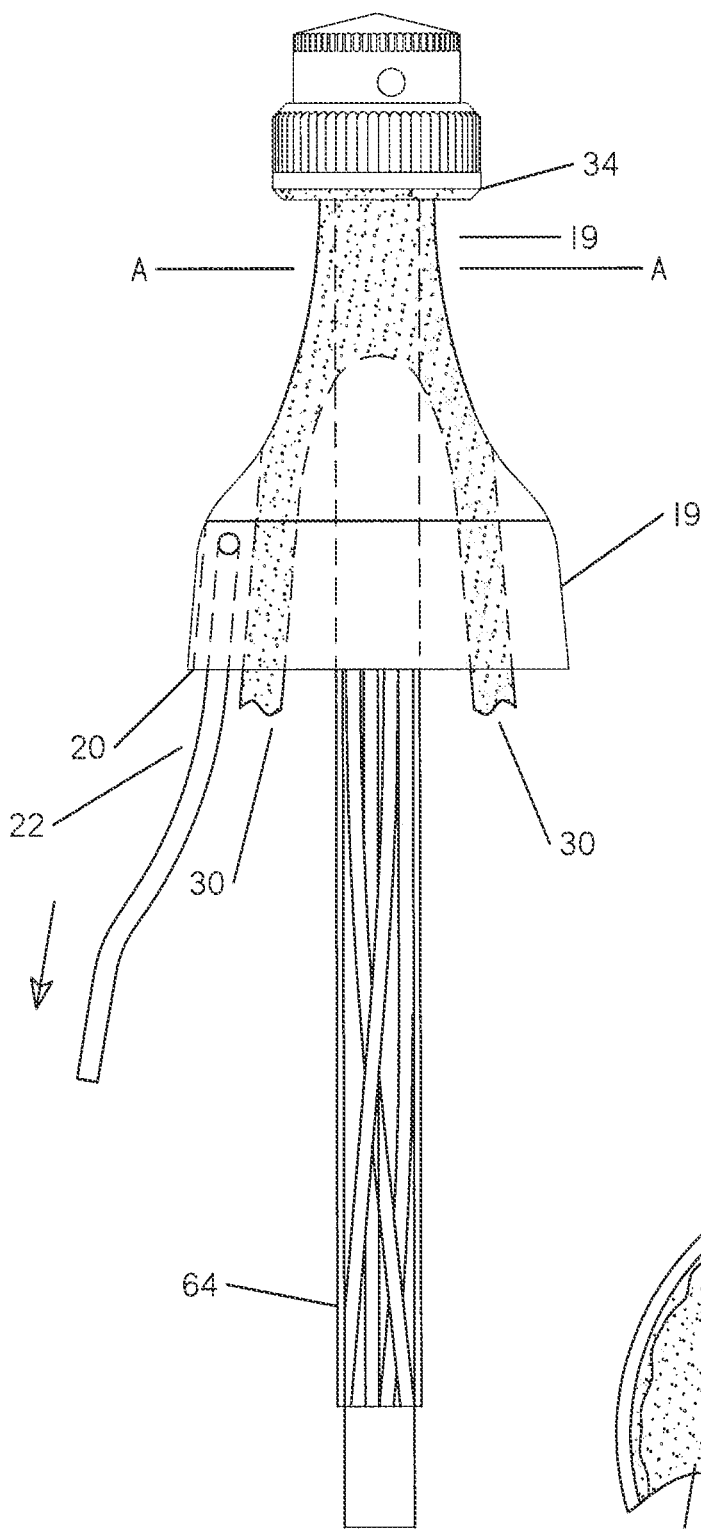
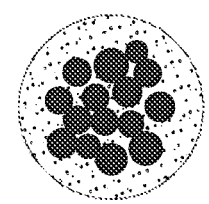
Fig. 5A
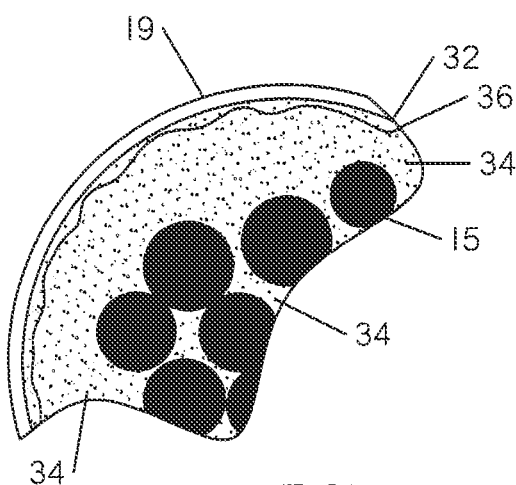
DETAIL 5A
Fig. 5

BOOT "FILLED" AND TIGHT
NO FLAMES NEEDED!

SHRINK BOOT SEALANT ASSEMBLIES

This utility application incorporates by reference and claims priority to U.S. Provisional Application No. 62/792,666, filed Jan. 15, 2019. This application incorporates by reference: U.S. Patent Publication No. 2011/0011484, and U.S. Pat. Nos. 3,515,798; 6,530,577; 6,693,320; 7,279,516; 10,150,555; 9,136,687; and 3,515,798, and U.S. application Ser. No. 16/021,391, filed Jun. 28, 2018.

FIELD OF THE INVENTION

Shrink boots and sealant assemblies for providing a cover and environmental sealant to protect or shield power cables and connections.

BACKGROUND OF THE INVENTION

Shrink boots or shrink boot assemblies are hollow bodies and are used with electrical or other apparatuses to provide protection and mechanical support.

Examples of an apparatus that may be deployed within a shrinkable hollow body include, but are not limited to, connectors, cable ends, lugs, splices, or other suitable devices such as cables and wires for electrical applications, fibers for telecommunications applications, cords, pipes, branched cables, barrier boots, butt splices, conduit joints, secondary distribution connections, buss connections, cable-to-buss connections, 3-core cables, coax cables, coax connectors, bolts, hardware, irrigation components, pin and sleeve components, and any other form of apparatus that may need sealing from a shrink tube.

SUMMARY OF THE INVENTION

An assembly for use with an electrical wire connector assembly. The assembly may comprise a cylindrical shrink boot having a shrinkable tube and configured to fit over a wire or bundle of wires and also surround at least part of the electrical wire connector assembly. An annulus is formed between the outside of the bundle of wires and the inside of the shrink boot. A cylindrical sealant assembly is dimensioned to fit in this annulus, may comprise a support structure and, in some embodiments, a tacky, flowable polyurethane gel. The shrinkable tube may be a heat shrink tube. In some embodiments, the shrink boot is a cold shrink boot and includes a removable inner support. The removable support may be a coil, wherein the removable support is a rigid non-coiled support.

Applicant discloses several sealant assemblies to be used between a pre-shrunk (heat or cold shrink) tube or sleeve and a bundle of wires (with or without a jacket). These assemblies could include a cylindrical structure comprising a support structure and a cured, soft, deformable, tacky polymer, in some embodiments, a gel (see, for example, FIG. 1). These assemblies also could include an injectable, flowable, cure in place polymer, such as a two-part cure in place polyurethane gel, (see, for example, FIG. 10E). The mix may, in some embodiments, cure to a soft, tacky, deformable polymer. These assemblies may also include a stretchable or non-stretchable tape comprising a skeleton or foam and a tacky, soft, deformable cured polymer, in some embodiments, a polyurethane gel (see, for example, FIG. 10A).

Methods for forming a shrink boot and sealant assembly from the above embodiments are also disclosed.

BRIEF DESCRIPTION OF THE DRAWINGS

FIG. 1 is an illustration in elevational view of a connector assembly engaged with a shrink boot and sealant assembly with the sleeve of the shrink boot in an expanded position.

FIGS. 2, 3, and 4 are illustrations of a first embodiment of a sealant assembly for use with a shrink boot assembly.

FIGS. 3A, 3B, and 3C illustrate alternate embodiments of a sealant assembly for use with a shrink boot assembly for sealing about a connector.

FIG. 5 is an illustration of a connector assembly with a shrink boot and sealant assembly showing the shrink boot partially collapsed about a connector assembly.

FIGS. 5A and Detail 5A illustrate a cross-section about plane A-A' of FIG. 5.

DETAILED DESCRIPTION OF THE PREFERRED EMBODIMENT

Figure 6:
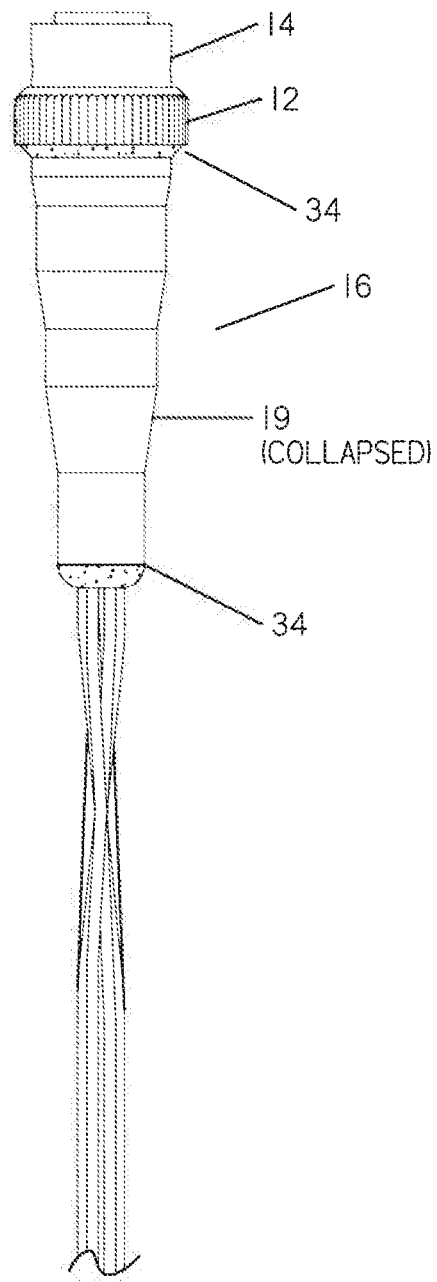
FIG. 6 illustrates a shrink boot and sealant assembly in a shrunk or final form, wherein the sleeve of the shrink boot sealant assembly is in a collapsed or shrunk position about at least some of the insulated wires of the connector assembly.

FIGS. 1, 5, and 6 illustrate a shrink boot and sealant assembly 16 for sealing about a connector assembly 8, so as to provide protection, strain relief, and an environmental seal to help prevent the penetration of moisture into connector assembly 8.

Various embodiments of the shrink boot and sealant assembly 16 can be used in various industries and in various applications. Embodiments can be utilized, for example, in the electrical industry for protecting cables or other apparatus, telecommunications industry for protecting fibers or other apparatus, automotive industry, irrigation industry, mining industry, utilities industry, energy industry, construction industry, and any other industry that may benefit from the increased protection provided by the protective core, the shrinkable material, and the sealant. Applications can include utilization for rejacketing a cable or series of cables, terminating a cable or series of cables, grounding connections, antenna connections, industrial pin and sleeve connections. Exemplary applications can include, but are not limited to, branch applications, barrier boot applications, mining cable splice applications, conduit joint seal applications, floodseal applications, end cap sealing applications, cellular tower applications including cellular tower grounding connector sealing applications and/or cellular tower splice applications, electrical box applications, insulating hardware including lugs/bolts, irrigation applications, and lighting applications, such as airport lighting and/or street lighting, as well as many other applications for which the article is suitable. Specific applications are disclosed for use in aircraft.

FIG. 1 illustrates some components of connector assembly 8, including a connector backshell 10, a coupling ring 12, a connector 14 (male or female), and multiple insulated electrically conductive wires 15, which may, in some embodiments, be covered with an insulated jacket 21. This is only illustrative of a type of connector assembly that the embodiments disclosed may be used with. Applicant's embodiment may be used wherever strain relief boots or covers are used. Connector assemblies are useful in vehicles, including aircraft and, in some cases, require or benefit from a shrink boot about the connector assembly, the shrink boot often useful in helping relieve stress and strain at the junction for electrical connection.

Multiple insulated electrically conductive wires 15 may enter backshell 10, the backshell, in some embodiments, providing a housing to the multiple insulated wires for housing connector ends of the multiple insulated wires. Connector ends may be male or female for engagement to or with a cooperating element, sometimes through the use of coupling ring 12, such as a threaded coupling ring. Connector assemblies 8 of various configurations are known in the art and sometimes include male and female connectors, coupling rings, and multiple insulated wires.

To prevent stress and strain at the junction of the multiple insulated wires and the backshell boot, in some embodiments, shrink boots are often used to shrink about the wires (or a jacket 21) and at least some of the connector assemblies. Shrink boots may be heat shrink or cold shrink boots. The former uses heat, such as heat from a blow dryer or heat gun, to shrink a boot about a connector assembly, sometimes including the insulated wires. Cold shrink boots, such as those disclosed in U.S. Pat. No. 3,515,798 and US Patent Publication No. 2011/0011484 (incorporated herein by reference), are known in the art. Unlike heat shrink boots, cold shrink boots typically comprise an elastic tube or sleeve held in an opened position by a rigid or an inner support coil, which may be comprised of wound or coiled elements which may be unwound, allowing the tube to shrink from its stretched condition to a shrunk and snug position about a connector assembly. Elastic sleeves for use as described herein may be found in U.S. Pat. No. 9,136,687 (see Col. 3, second paragraph, for example) and U.S. Pat. No. 3,515,798, both incorporated herein by reference. Elastic sleeves may be electrically insulating, stable, and durable.

Applicant provides, for use with connector assembly 8 or any connector assembly, a shrink boot and sealant assembly 16, which, in some embodiments, comprises a heat or cold shrink boot assembly 18 combined with a sealant assembly 30, such that the shrink boot and sealant assembly provide both stress and strain relieving functions of a shrink boot alone along with the additional functions, including an environmental and moisture seal of sealant assembly 30, such as that disclosed herein.

In FIGS. 1, 5, and 6, it is seen how shrink boot assembly 18 is typically cylindrical in shape with an open core. Moreover, shrink boot assembly 18 is seen, in some cold boot embodiments, to have a support coil 20 holding an elastic tube 19 in an expanded position in FIG. 1, a partially collapsed condition in FIG. 5, and a fully collapsed condition in FIG. 6. In cold boot embodiments, elastic tube or sleeve 19 is shown in FIG. 1 in a highly stretched or radially expanded condition. Note that element 19 may also be a preheated heat shrink sleeve, and shrink assembly 18, in those embodiments, will typically be comprised of only the heat shrink sleeve.

Moreover, it is seen with respect to FIGS. 1 and 4 that, in some embodiments, sealant assembly 30 is also cylindrical with an open core, but has a smaller diameter and fits inside telescopically into an annulus between the inner surface of the shrink boot assembly 18 and the outer surface of a bundle of insulated wires 15. Typically, this "cylinder within cylinder" or telescopic structure leaves in the open or pre-shrunk condition (see FIG. 1) a Gap A and a Gap B; Gap A between an outer surface of sealant assembly 30 and an inner surface of the shrink boot assembly 18, and Gap B between an outer surface of the bundle of insulated wires 15 (or jacket 21) and an inner surface of sealant assembly 30. In some embodiments, Gap A may be in the range of 10 to 250 mil and Gap B in the range of 10 to 250 mil.

Turning now to the structure of sealant assembly 30, it is seen to comprise, in some embodiments, a cylindrical structure with, in some embodiments, flexible outer sheet 32, a soft, flowable sealant 34, and a flexible inner sheet 36. Sealant 34 may, in some embodiments, have a number of properties that allow it to provide an effective environmental seal when the sleeve is in a collapsed condition, for example, helping to prevent the ingression or absorption of moisture in the wires and connector about the boot. Further details of the physical and chemical properties of the sealant used in the sealant assembly may be found in the following patents incorporated herein by reference: U.S. Pat. Nos. 6,530,577; 6,693,320; and 7,279,516. These patents disclose a sealant which, in some embodiments, may be a soft, deformable, non-adhesive, cured, tacky, polyurethane gel that is inert, has no silicon, may have a hardness in some embodiments between 30 and 150 (37.5 gr. half cone penetrometer), and may retain its properties, including its elastomeric properties while going through multiple thermal and pressure cycles, such as may be found in an aircraft environment. In some embodiments, sealant 34 is a cured, tacky elastomer gel that is non-adhesive and thus allows easy removal from the connector by slicing the elastic tube longitudinally and peeling it off. The elastomeric sealant may be wiped off with a clean cloth damp with alcohol. The sealant assembly and/or the sealant may be comprised of flame retardant and/or non-smoke toxic and/or aircraft fluid resistant materials, thus making it useful for aircraft applications.

Outer sheet 32, as illustrated in FIG. 4, may be a thin plastic, polypropylene or other material that will adhere in a moisture proof manner to the sealant. Inner sheet 36 may be a similar material, but may, in some embodiments, have multiple holes 36a therein. In some embodiments, sheets 32/36 may be solid or may have multiple holes therein. Both inner and outer sheets are, in some embodiments, flexible and may adhere to sealant 34, that is sandwiched therebetween as seen in FIGS. 2, 3, and 4, for example. FIG. 3 illustrates sealant assembly 30 in a flat configuration, prior to installation and before it is rolled to form the ready to use cylindrical structure seen in FIGS. 2 and 4.

FIGS. 3A, 3B, and 3C illustrate alternate embodiments of sealant assembly 30, as seen in FIGS. 2, 3, and 4. FIG. 3A illustrates sealant assembly 30a being the same in all material aspects as sealant assembly 30, except having no inner sheet 36. FIG. 3B illustrates an embodiment 30b of sealant assembly comprising a web or skeleton 38, such as those disclosed in the patents or publication incorporated herein by reference or in U.S. Pat. No. 10,150,555, also incorporated herein by reference. In FIGS. 3B and Detail 3B, a skeleton is seen to be a web or a woven mesh that is flexible so that it may be formed into the cylindrical structure of the sealant assembly. An embodiment of sealant assembly 30b as seen in FIG. 3B, may or may not include an outer sheet 32 and/or an inner sheet 36. FIG. 3C illustrates another embodiment of sealant assembly 30c, here, comprising an open or at least partially open CELL foam 40, saturated or at least partially saturated with sealant 34. Again, sealant assembly 30c is rolled typically from a flat tape or flat sheet into a cylindrical shape which may have a seam 35, which seam can be covered with a tape (see, for example, FIG. 4) or other suitable member.

Thus, it is seen that sealant assemblies 30/30a/30b/30c (collective sometimes 30) all have in common at least sealant 34 typically comprises some of the properties set forth herein, and in some support structure to which sealant 34 adheres or sticks. In sealant assembly 30, support structure is comprised of outer sheet 32 and/or inner sheet 36. In sealant assembly 30a, support structure is only outer sheet 32. In sealant assembly 30b, support structure is at least web or skeleton 38, typically at least partly saturated with sealant 34. In sealant assembly 30c, support structure is open or at least partially open cell foam 40. In some embodiments, using a heat shrink sleeve, the outer 34 and/or inner sheets 36 may also be heat shrinkable sheets. Indeed, foam 40 and web material 38 may be heat shrinkable. Thus, for heat shrink embodiments, the support structure (foam, web, and/or sheets) can shrink radially as heat is applied with the heat gun or other heat source.

Turning now to FIGS. 1, 5, and 6, a process or method of assembling and shrinking shrink boot and sealant assembly 16 is disclosed. Connector assembly 8 can be any type of connector where, in some embodiments, one set of wires or wiring harness is connected to another set of wires or another wiring harness and, wherever boots have been used before, boots may now be used with Applicant's novel sealant assembly 30. In FIG. 1, sealant assembly 30 is used with a cold shrink boot assembly and is dimensioned to fit within the cylindrical cold shrink boot assembly 18 in the annulus between the inner surface and the outer surface the bundle wires. As known in the art, a ripcord 22 of the cold shrink boot may be manually pulled while cold shrink boot assembly with sealant assembly 30 already inserted therein begins collapsing elastic tube 19. FIG. 5 illustrates a partially collapsed elastic tube 19 where the ripcord is being pulled in the direction of the arrow indicated and elastic tube 19 is collapsing as the ripcord is withdrawn from the annulus between the outer surface of sealant assembly 30/30a/30b/30c and the inner surface of the shrink boot assembly. The structural elements of sealant assembly 30, which may include outer sheet 32 and/or web 38 and/or foam 40, typically provides sufficient integrity to the flowable sealant assembly 30, such that the ripcord can be withdrawn without destroying the integrity of the sealant assembly 30. FIG. 6 illustrates the completed collapsed elastic tube 19 in final configuration of shrink boot and sealant assembly 16, where the ripcord 22 and coil support 20 has been fully removed and elastic tube 19 is in a fully collapsed position. In some embodiments, alcohol, such as isopropyl alcohol may be applied, as by a dampened lint-free cloth to the inner surface of the cold shrink boot assembly just before use (before inserting sealant assembly). The alcohol on the ripcord will prevent any gel or other sealant from sticking to it and pulling out.

As elastic tube 19 shrinks while the ripcord is being withdrawn, it forces the sealant 34 about, around, and among wires of the bundle of insulated wires 15 (or onto jacket 21) as seen in FIGS. 5A and Detail 5A. What is seen in FIGS. 5A and Detail A is a cross-section of the collapsed elastic tube 19. Detail 5A illustrates that the collapsing action or contraction of the elastic tube has forced at least some of the flowable deformable soft polymer gel out of the sealant assembly 30 and into the spaces between the wires so as to provide a filling of, in some embodiments, a flowable, tacky sealant material about the wires to help prevent moisture from entering, especially near the ends of the boot. Also, Detail 5A shows that, in some embodiments, sealant may contact inner walls of tube 19. Typically, the volume of gel or other sealant 34 in sealant assembly 30 is chosen to be sufficient to fill the volume comprising the airspace around the wires or the bundle of wires when elastic tube 19 is in the collapsed position (see FIG. 6). Indeed, there is typically more than enough volume of sealant 34, such that during compression while the elastic tube contracts as the ripcord is withdrawn, sealant will squeeze out the ends and typically some trimming is needed to wipe off the excess sealant (see, for example, FIG. 5, lead line where sealant excess 34 has squeezed out the removed edges of collapsed elastic tube 19.)

Figure 7:
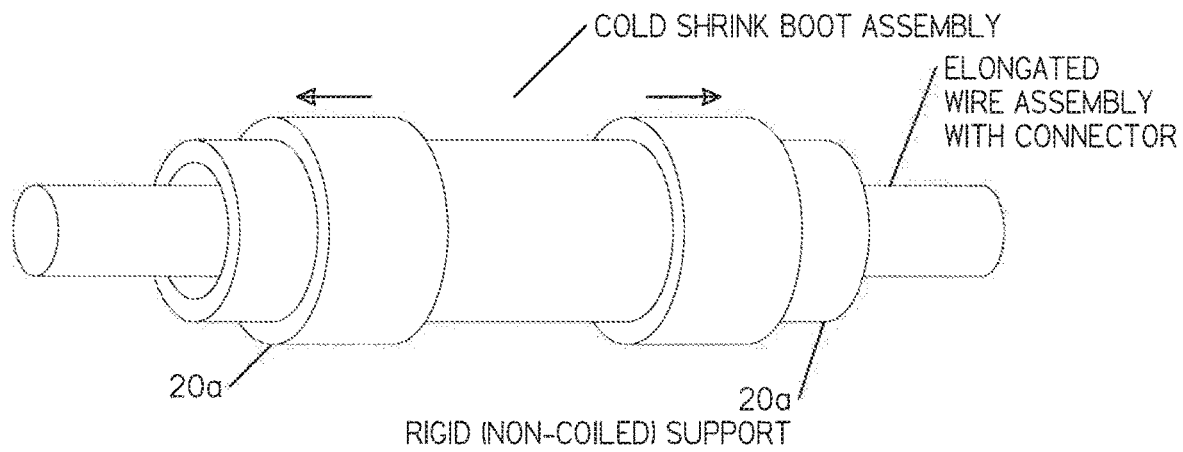
FIG. 7 illustrates a cold shrink boot having a non-coiled inner support and FIG. 7A illustrates the use of a sealant assembly therewith.
Figure 7A:
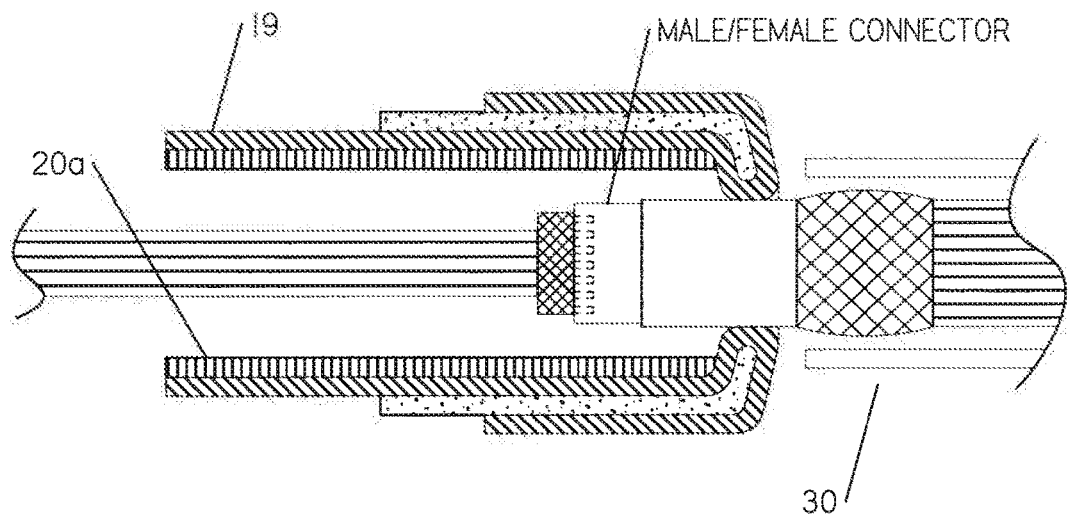

FIG. 7 illustrates a cold shrink boot assembly with a rigid (non-coiled) support 20a within an elastic tube or sleeve 19 as found in the '687 patent. This is an application where the rigid support is slideably removed from the elastic tube. FIG. 7A illustrates that any of the sealant assemblies 30 may be inserted typically prior to, or just after, the commencement of collapsing of the tube or sleeve from its expanded state.

Figure 8:
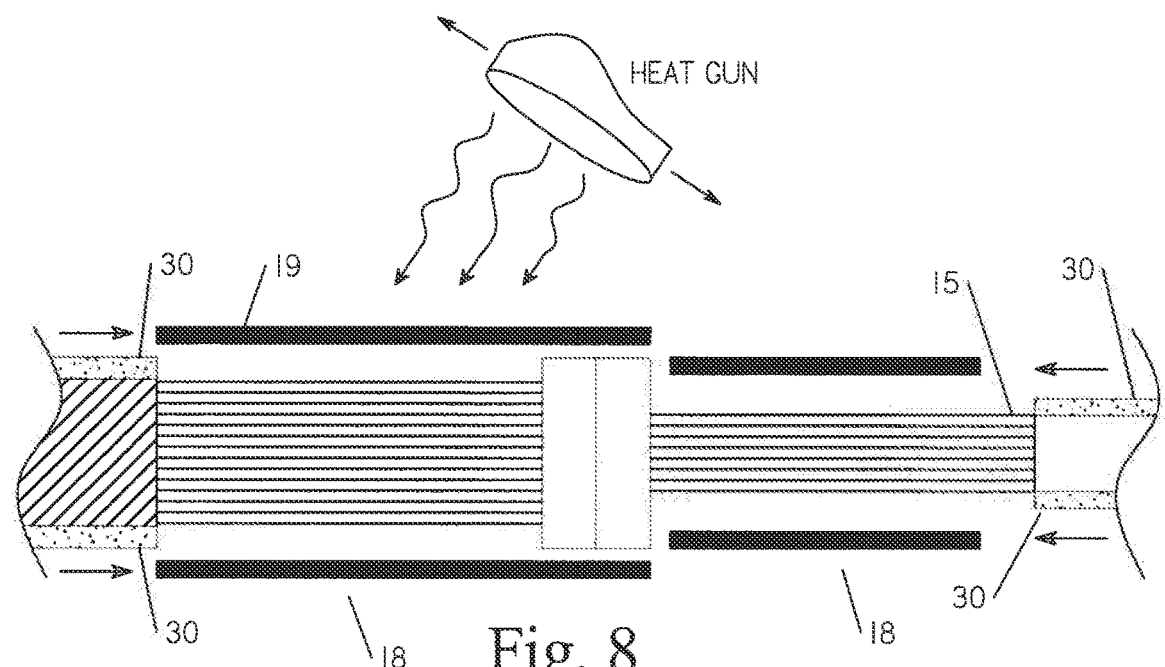
FIGS. 8 and 8A illustrate a compound assembly comprising a pair of shrink boot and sealant assemblies to form a compound assembly.
Figure 8A:
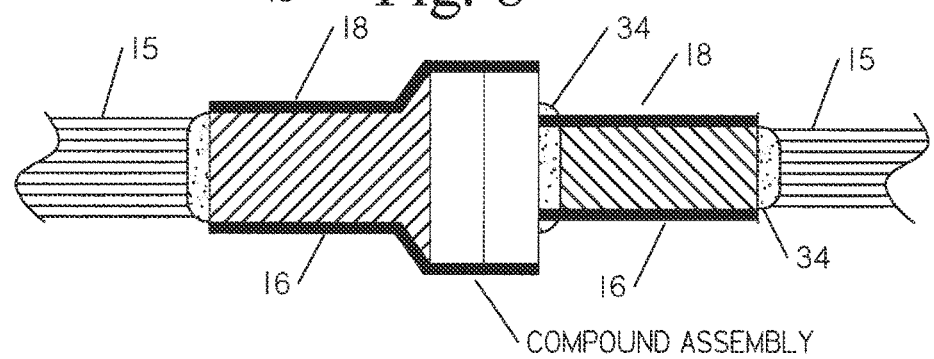

FIGS. 8 and 8A illustrate an electrical connection having a different diameter of wire bundles (or jacket) on either side of a connector and also illustrate the use of an expanded tube 19 comprising a heat shrink sleeve as contrasted with a shrink boot assembly as seen in FIGS. 1 and 7A, for example, comprising a cold shrink boot. The use of sealant assembly 30 and boot assembly 18 of a larger diameter on the side of the connector with the larger bundle (or left in FIGS. 8 and 8A) and a smaller sealant assembly and smaller boot assembly on the opposite side. The result is a compound boot and sealant assembly, made up of two or more boot and sealant assemblies. Two different boot assemblies and two different sized sealant assemblies may be used on either side of the connector.

Figure 9:
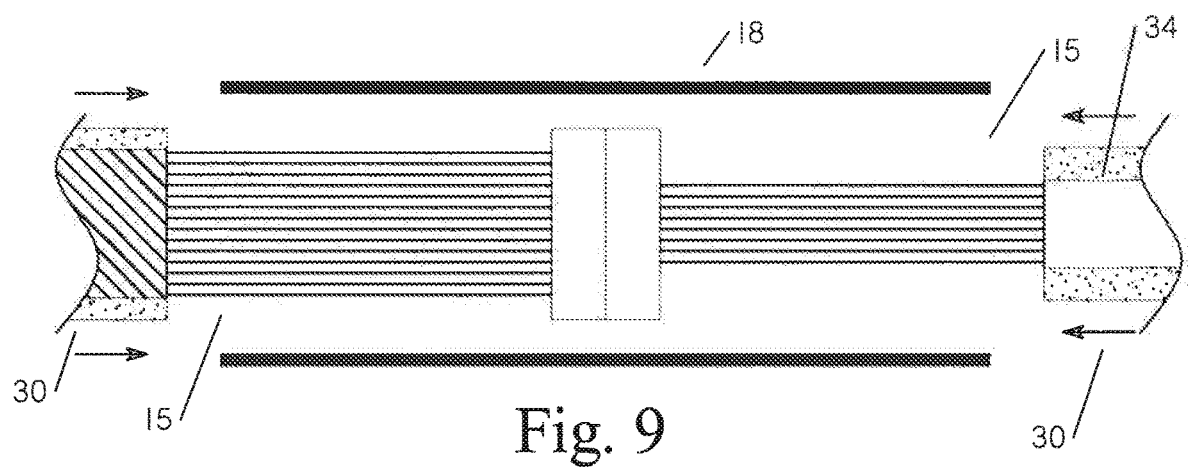
FIG. 9 illustrates a shrink boot and sealant assembly formed from two different sized sealant assemblies.

FIG. 9 illustrates a single shrink boot assembly 18 straddling a connector and using a thicker sealant assembly on either side of the connector, here, the thicker on the right side to provide more "make up" sealant 34, if needed, for a smaller wire bundle.

Examples of cured or curable composition or systems can include thermal curable or thermoset sealants, radiation curable sealants, water curable sealants, or other types of curable sealants. Thermal curable or thermoset sealants can include resin compositions such as epoxy, polyurethane, polyester, acrylate, or other types of resins that demonstrate a degree of hardness after curing or setting. Other curable compositions can include embodiments of two-part curable gels that are in liquid or semi-liquid form during mixing and injection or installation, whereby mixing takes place during injection (see two-part injector 48, FIG. 10C), curing takes place after the curable gel is injected or installed within the tubular portions of the article. Curable gel compositions can be capable of making a physical transformation from a liquid to a rubbery, gel semi-solid that will cure in place to form a rubber-like, tacky hydrophobic soft gel sealant. In addition, some curable compositions can provide moisture protection which may offer advantages in particular applications.

Alternate shrink boot sealant assemblies may utilize a overlapping wrap instead of the cylindrical structure 30 seen in FIG. 4. These will provide wrapping overlapping courses and then be covered with a shrink boot assembly, hot or cold (see FIGS. 10A, 10B, 10C, and 10D). All of the embodiments of shrink boot and sealant assemblies disclosed herein are especially useful in aircraft environments, which are often subject to multiple thermal and pressure cycling as an aircraft takes off, climbs the altitude, descends, and lands. For example, they may be used as sealant and moisture proofing around mated electrical connectors, coaxial connectors, and circumferential and irregular surfaces. When a stretched tape is used, it will provide compression on the wires in addition to the compression of shrunk elastic tube 19. Applicant's various sealing assemblies, whether comprising the cylindrical structure or overlapped tape, typically use sealant 34 that maintains its sticky, flowable (under compression) character despite multiple thermal cycles as may be found in an aircraft environment. In some embodiments, the sealant assembly 30/30a/30b/30c/44 is flame retardant and/or resistant to degradation upon exposure to aircraft hydraulic fluid and/or jet A fuel and/or Skydrol resistant. The sealing assembly may pass the flame test FAR 25.853a, and may be aircraft fluid resistant (see U.S. application Ser. No. 16/021,391, incorporated herein by reference). In some embodiments, tube 19 or the boot assembly, whether heat shrink or cold shrink, may have one or more of these characteristics also. For example, Applicant's sealant assembly may be flame retardant and may be used in conjunction with a flame retardant boot for sleeve to provide a flame retardant seal to the junction where both strain relief and sealant properties are beneficial.

FIGS. 10A, 10B, 10C, and 10D illustrate an alternate embodiment of shrink boot and sealant assembly comprising a multiple overlap sealant assembly 44. In some embodiments, a foam tape 31 with cured polyurethane is used as a support structure and may be nonstretchable or stretchable, but is sticky on one or both sides (and may have a web or mesh 38 in place of or with foam) (see FIG. 3B), in some embodiments, a fiberglass mesh. In some embodiments, tape 31 may be stretchable and have sometimes may have skin or outer surface 32 (see FIG. 3A). Tape 31 may be applied directly to the bundle of insulated wires or the jacket. This embodiment utilizes, in the alternative to cylindrical structure of sealant assemblies 30/30a/30b/30c, tape 31 (which, in some embodiments, may be a stretchable foam) at least partially soaked with a cured tacky polyurethane as set forth in U.S. Pat. Nos. 6,530,577; 6,695,320; and 7,229,516, incorporated herein by reference. One side 31a of tape 31 may, in some embodiments, be tacky so that when wrapped around a conductor or bundle of wires 15 (which may be encased in a cover) and which may include a connector will stick to the wires or connector parts, and stick to itself as it is stretched and wrapped in overlapping courses (see FIGS. 10A and 10B).

Figure 10A:
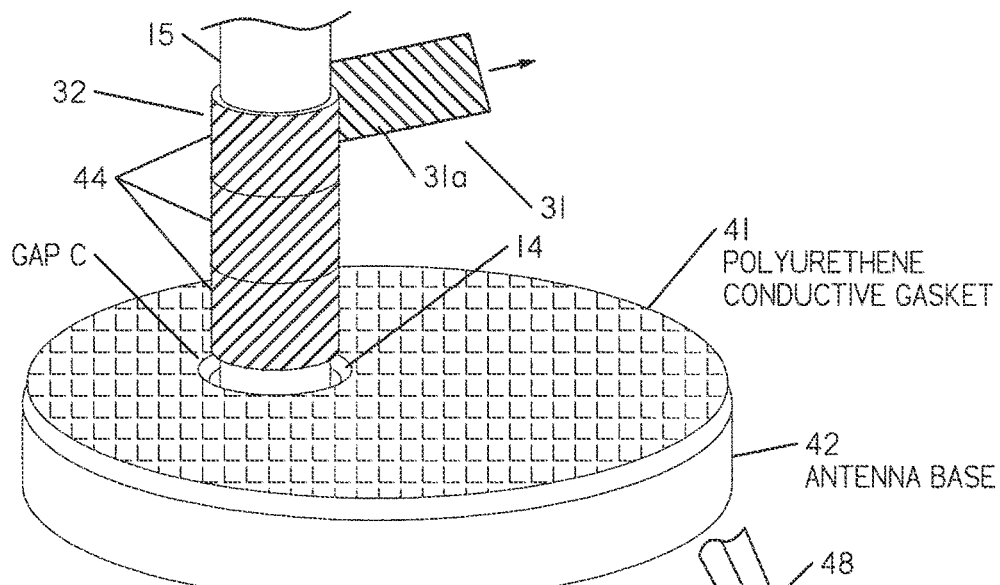
FIGS. 10A, 10B, 10C, 10D, 10E, and 10F illustrate several alternate sealment assemblies to use with shrink boots.
Figure 10B:
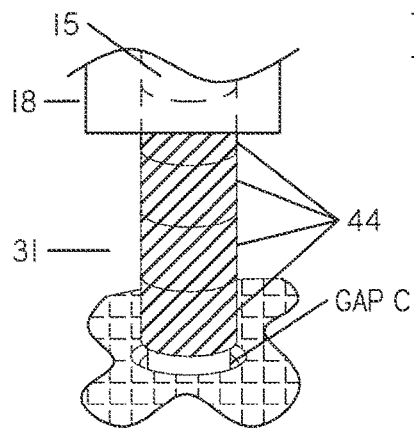

FIG. 10B illustrates tape 31 that has been wrapped, several inches, in some embodiments, from the connector point where the connector engages on enters an antenna base 42 that may be part of the exterior of an aircraft, such as a plane or helicopter. It is seen in FIG. 10B that there may be a gap C between connector 14 and a base conductive gasket 41, which may be a tacky polyurethane gel gasket as set forth in U.S. Pat. Nos. 6,530,577; 6,695,320; and 7,229,516, incorporated herein by reference. This gap C may, optionally, be filled with a tacky, two-part cure in place injectable mix 46. One such cure in place injectable is available from a two-part injector 48, typically manually operated containing two compartments 48a and 48b, forcing element 48c and a mixing nozzle 48d, such as Av-DEC #HT3265, available from Av-DEC, Fort Worth, Texas. The two compartments contain a two-part mix that, when the forcing element is manually pressed, will mix in mixing nozzle 48d and, simultaneously be deposited out of the tip of the nozzle into the gap area C. This cure in place injectable mix 46 provides, along with the conductive gasket 41 additional sealants for corrosion protection where the insulated wire or wires 15 meet antenna base 42. Moreover, for additional support and protection to wrapped tape 31, a shrink boot assembly 18 may be inserted over the multiple overlap sealant assembly 44, in an expanded position and seated with its removed and adjacent to an upper surface of the antenna base or against an upper surface of the conductive gasket 41 or against an upper surface of a cure in place mix 46. It may then be shrunk as, in some embodiments, by pulling ripcord 22 (see FIG. 1). The resulting shrink boot sealant assembly 16a is seen in FIG. 10D with elastic tube 19 tight to the overlap course sealant assembly 44.

Figure 10E:
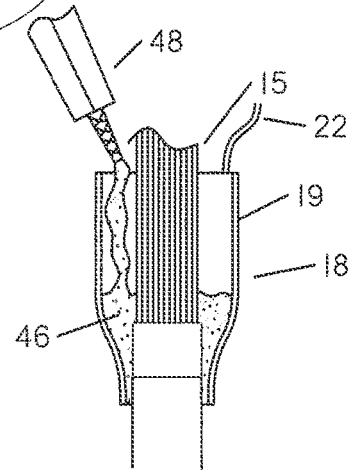
Figure 10D:
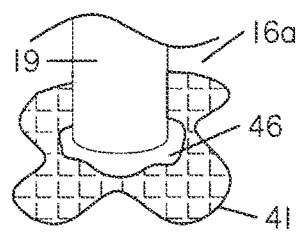
Figure 10C:
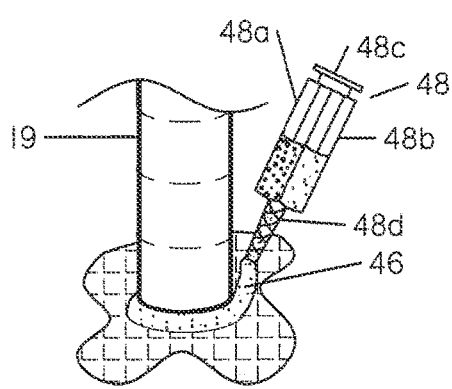
Figure 10F:
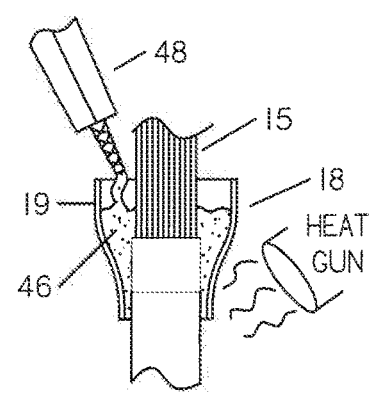

FIGS. 10E and 10F illustrate use of an injectable mix as a sealant assembly, such as cure-in-place injectable mix 46 that flows from two-part injector 48 with either cold shrink (FIG. 10E) or heat shrink boot (FIG. 10F). Here, the method of using the cure-in-place injectable mix 46 shows the vertical orientation of the assembly and the closure of the removed end of the connector assembly to create a "container or cavity" for mix 46 to pool. One may partially or fully fill the cavity with cure-in-place mix 46 and complete shrinking either before or after curing of the mix (typically 10 to 30 min.), and wipe off excess squeeze out that may occur from the shrink boot collapsing. It helps with injecting into the annulus with an unjacketed bundle of wires if you push the tip of the nozzle into the wire bundle to help wet the wires. Also, one may spread the wires by hand when filling up the annulus with the injectable mix. Note that the injectable process shown in FIGS. 10E and 10F is shown without use of sealant assemblies 30/30a/30b/30c/44; however, one may start with an uncollapsed or partially collapsed sleeve 19 and then place sealant assembly 30/30a/30b into the cavity with injectable mix 46 as a supplement sealant. One may also wrap with tape 31, place expanded sleeve 19 about the wrapped connector, collapse removed end, squirt in injectable mix 46, collapse the boot (heat, ripcord or roll off), then clean up squeeze out. To prevent the ripcord from dragging out the mix, the inner surface of shrink boot assembly may be coated with isopropyl alcohol or other alcohol which will prevent, temporarily, the mix from sticking to the ripcord. A clean, line-free cotton cloth may be dampened with alcohol and pushed through the shrink boot assembly just prior to filing with the mix. The injectable cure in place mix may, in some embodiments, cure to a soft tacky gel with hardness of between 30-150, 35 gr. half cone penetrometer.

Figure 11A:
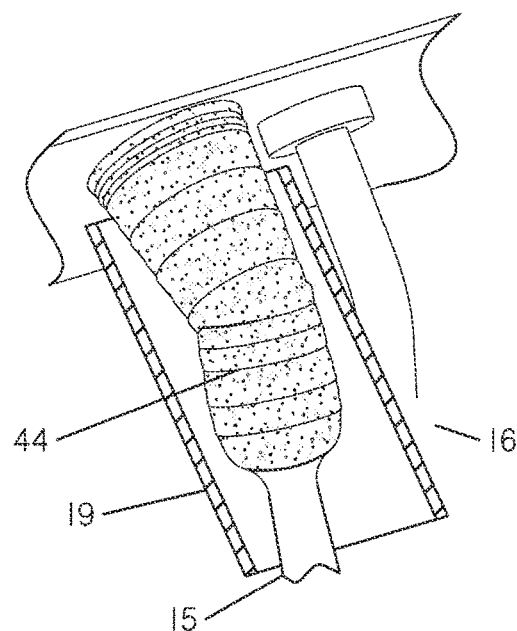
FIGS. 11A, 11B, and 11C illustrate some uses of sealant assemblies using tape wrapped in multiple courses.
Figure 11B:
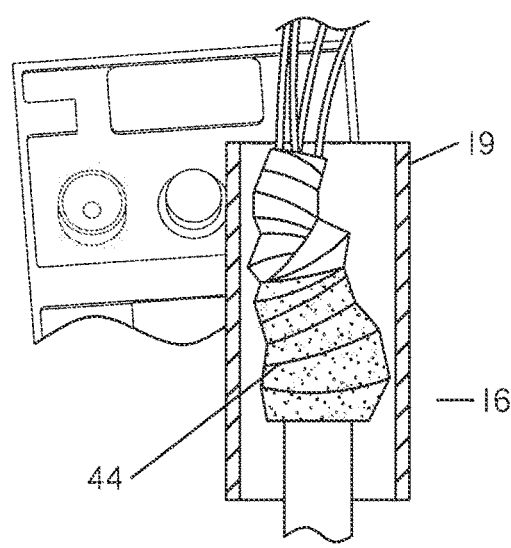
Figure 11C:
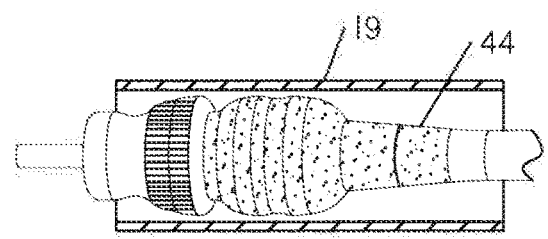

FIG. 11A illustrates Applicant's shrink boot sealant assembly comprising a shrink wrap boot 19, either hot or cold, about a sealant assembly comprising multiple overlapping courses sealant assembly 44 ("multiple course sealant assembly") of sealant tape 31 adjacent connection into a panel such as an electrical panel. Shrink boot assembly may be heat shrink or cold shrink. FIG. 11B illustrates an embodiment of multiple overlapping courses sealant assembly 44 about an irregular junction of wires, which thickness may vary, is non-uniform or irregular. FIG. 11C illustrates the use of shrink boot assembly 16 about multiple course sealant assembly 44, here, including a back shell and shrink boot with expanded tube 19. FIGS. 11A, 11B and 11C illustrate tube 19 in an expanded or pre-shrunk condition. When shrunk down, tube 19 is tight against an inner surface. The cold shrink boot may be either ripcord type (see FIG. 1) or roll off (see FIG. 7A).

Figure 12:
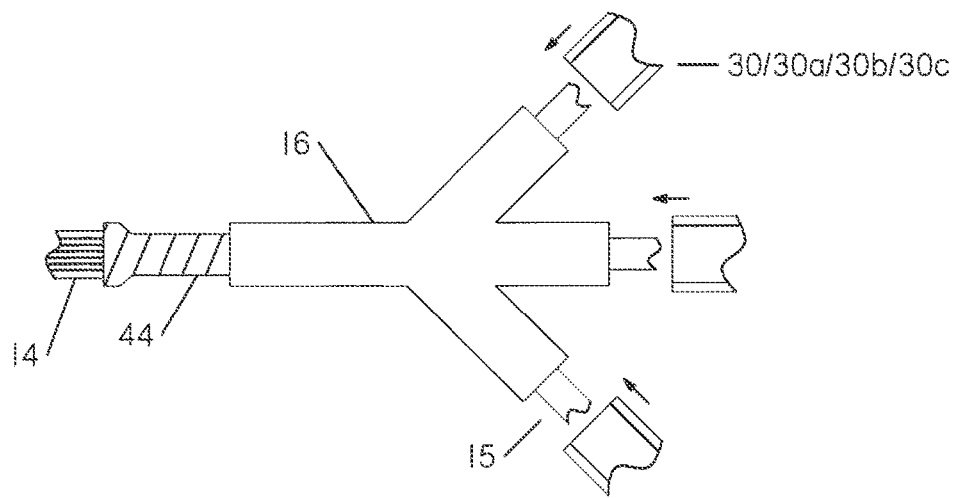
FIG. 12 illustrates the use of two or more different types of sealant assemblies with the same boot.
Figure 14:
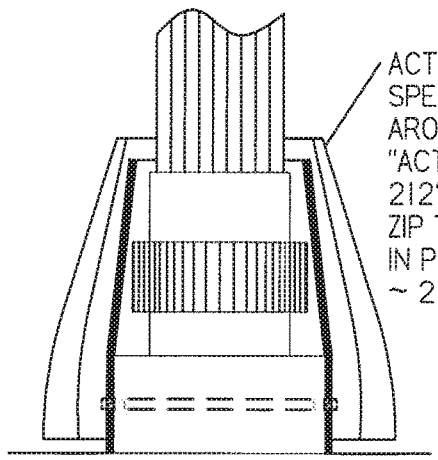
FIGS. 13, 14, 15, and 16 illustrate a flameless and non-electrical method of shrinking heat shrink boots.
Figure 13:
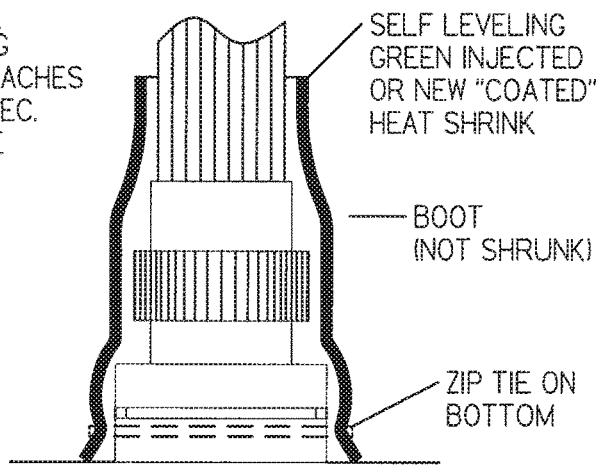
Figure 15:
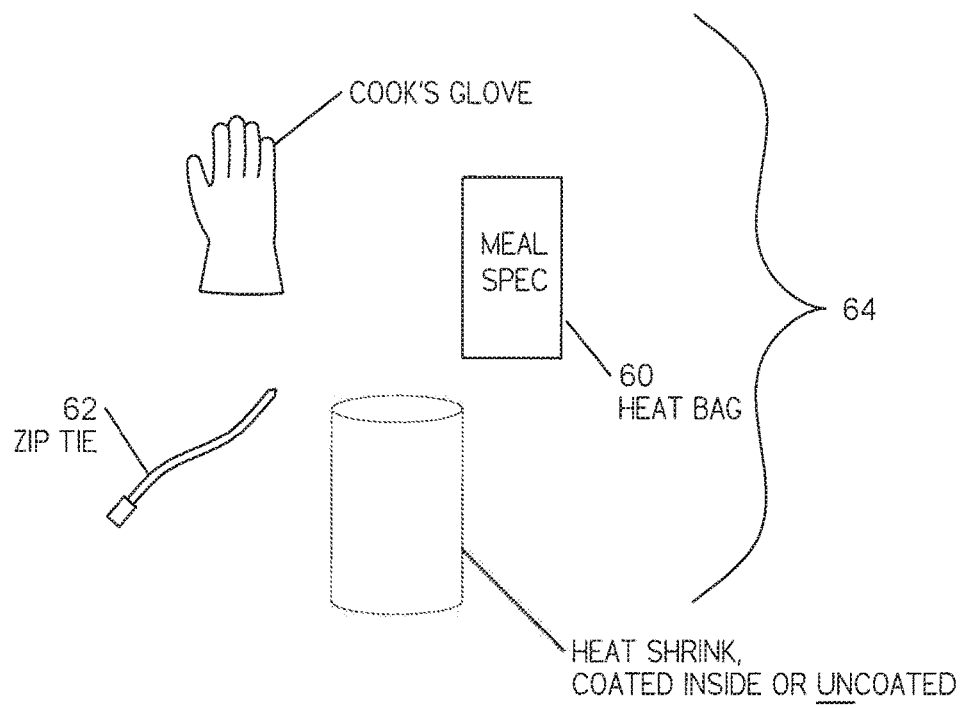
Figure 16:
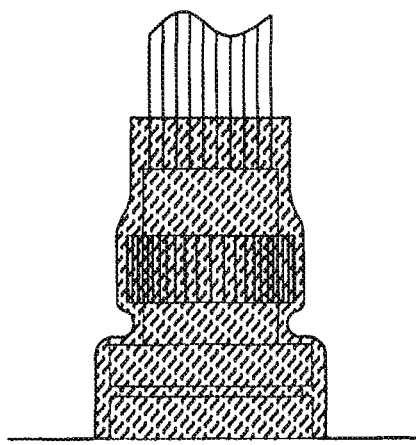

FIG. 12 illustrates a branched shrink boot assembly 18. This branched assembly may utilize both/and/or multiple courses sealant assembly 44, as well as cylindrical preformed sealant structures 30/30a/30b/30c, to provide sealing as well as strain relief to a wire connection having multiple branches. In some applications, the shrink boot and sealant assemblies may be used where wires from radio altimeter antennas engage the antennas adjacent the aircraft outer surface.

FIGS. 13-16 illustrate a flameless and non-electrical (no heat gun required) process of shrinking heat shrink boots. Polyolefin heat shrink boots require about 94° C. before they start shrinking. Heat packs are at ambient temperature before the user activates them and, typically, start an exothermic chemical reaction within the bag. Most heat packs (like the ones used on sore muscles) only generate about 40 to 45° C.—not enough for traditional heat shrink tubing. Recently, a "super heat" pack was put on the market called "Meal Spec" 60. It is used for hunters for cooking eggs without fire and for the military. It can generate about 212° F.

What Applicant is doing with the flameless heat shrink, is using meal spec 60 wrapped around a preshrunk heat responsive tubing or boot that may enclose a wire connection. A zip tie 62 is used to hold the bottom of the pre-shrunk tubing closed. One can either fill the preshrunk tubing with cure-in-place injectable mix, or use a preshrunk heat shrink tubing coated on the inside surface with cured polyurethane gel or cure-in-place mix 46, if a sealant is desired. Instead of using a heat gun, one may simply activate the "Meal Spec" (SKU: MRE1-24HT) heat pack MRE by adding a few ounces of water and wrap it around the heat shrink boot. One can tape it in place, but fairly quick 5 to 10 sec., as steam will generate inside the bag, and inflate the bag (see FIG. 14). The inside surface of the bag will be hot, so will the outside, so cooking glove might help and one can manually hold the "activated" bag in place. The temperature generated is at least 212° F. It is generated in about 12 seconds and lasts for up to 10 to 15 minutes. It may only take several minutes to heat shrink the tubing at about 212°—which is about what you get from a heat gun. A Meal Spec kit 64, injectable or coated, zip ties and maybe a glove (see FIG. 15) may be provided.

Although the invention has been described with reference to specific embodiments, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. An assembly for use with an electrical wire connector assembly, the assembly comprising:
    a cylindrical shrinkable cold shrink tube configured to fit over a jacketed or unjacketed wire bundle and surround at least part of an electrical wire connector assembly, the cylindrical, shrinkable cold shrink tube defining an annulus;
    a sealant comprising a tacky polymer, configured to fit in the annulus;
    wherein the sealant includes a cylindrical support structure; and,
    wherein the support structure includes a sheet with holes.

2. The assembly of claim 1, wherein the tacky polymer is a gel.

3. The assembly of claim 1, wherein the shrinkable cold shrink tube includes a removable support and the shrinkable tube is an elastic tube.

4. The assembly of claim 3, wherein the removable support includes a coil.

5. The assembly of claim 3, wherein the removable support is a rigid non-coiled support.

6. The assembly of claim 1, wherein the sealant is an injectable cure in place mix.

7. The assembly of claim 1, wherein the sealant comprises a tape impregnated with a polymer gel.

8. The assembly of claim 7, wherein the tape comprises stretchable foam.

9. The assembly of claim 1, wherein the cylindrical support structure includes a skeleton.

10. The assembly of claim 1, wherein the cylindrical support structure includes foam, at least partly open cell.

11. The assembly of claim 1, further including a shrink tube configured to cover at least part of the electrical wire connector assembly not covered by the cylindrical shrinkable cold shrink tube.

12. The assembly of claim 1, wherein the sealant is flowable in an uncured state and adapted to cure in the annulus.

13. The assembly of claim 1, where the sealant cures to a soft, tacky gel.

* * * * *